United States Patent
Sugiura

(10) Patent No.: US 7,299,119 B2
(45) Date of Patent: Nov. 20, 2007

(54) SEAT BELT SYSTEM HAVING OCCUPANT SENSING DEVICE

(75) Inventor: Takasi Sugiura, Kariya (JP)

(73) Assignee: DENSO CORPORATION, Kariya (JP)

( * ) Notice: Subject to any disclaimer, the term of this patent is extended or adjusted under 35 U.S.C. 154(b) by 282 days.

(21) Appl. No.: 11/079,247

(22) Filed: Mar. 15, 2005

(65) Prior Publication Data
US 2005/0209755 A1    Sep. 22, 2005

(30) Foreign Application Priority Data
Mar. 16, 2004    (JP) ............................. 2004-075010

(51) Int. Cl.
*G06F 17/00*    (2006.01)
(52) U.S. Cl. .................... 701/45; 701/36; 340/436; 280/728.1
(58) Field of Classification Search ............ 701/45–47, 701/36; 280/728.1, 734, 735, 730.1; 307/9.1, 307/10.1; 340/425.5, 457.1, 436
See application file for complete search history.

(56) References Cited

U.S. PATENT DOCUMENTS

| 5,074,583 | A | * | 12/1991 | Fujita et al. ............. 280/730.1 |
| 5,232,243 | A | * | 8/1993 | Blackburn et al. .......... 280/732 |
| 5,330,226 | A | * | 7/1994 | Gentry et al. ............... 280/735 |
| 5,552,986 | A |  | 9/1996 | Omura et al. |

* cited by examiner

*Primary Examiner*—Yonel Beaulieu
(74) *Attorney, Agent, or Firm*—Posz Law Group, PLC

(57) ABSTRACT

A seat belt system for a vehicle includes a collision predicting device, an occupant sensing device, a seat belt, a seat belt drive device and a seat belt control device. The collision predicting device senses an imminent collision of the vehicle before the collision actually takes place. The occupant sensing device determines an occupant state on a seat of the vehicle. The seat belt restrains an occupant to the seat. The seat belt drive device retracts and extends the seat belt. The seat belt control device drives the seat belt drive device to retract the seat belt and thereby to achieve a corresponding tension of the seat belt, which corresponds to the occupant, based on a signal outputted from the collision predicting device and occupant information outputted from the occupant sensing device.

7 Claims, 3 Drawing Sheets

SEAT BELT SYSTEM HAVING OCCUPANT SENSING DEVICE

CROSS REFERENCE TO RELATED APPLICATION

This application is based on and incorporates herein by reference Japanese Patent Application No. 2004-75010 filed on Mar. 16, 2004.

BACKGROUND OF THE INVENTION

1. Field of the Invention

The present invention relates to a seat belt system, which protects an occupant of a vehicle by restraining the occupant, more specifically, to a pre-crash seat belt, which retracts a seat belt prior to an unavoidable vehicle collision after the unavoidable vehicle collision is predicted.

2. Description of Related Art

One known vehicle occupant protective system is called a pre-crash seat belt system, which retracts a seat belt prior to an unavoidable vehicle collision after the unavoidable vehicle collision is predicted based on corresponding information, such as a following distance relative to a front vehicle or a brake operation by a vehicle driver (see, for example, Japanese Unexamined Patent Publication No. H06-286581 corresponding to U.S. Pat. No. 5,552,986).

The above seat belt system restrains the occupant by the seat belt with a fixed tension regardless of a body size and a weight of the occupant on a vehicle seat when it is determined that the vehicle collision is unavoidable. However, at the time of fastening the seat belt, a contact position of the seat belt relative to the body of the occupant and a restraining force of the seat belt vary from occupant to occupant depending on the body size of the occupant. Thus, even when the seat belt is retracted prior to the collision, the restraining force of the seat belt may be too weak for some occupants or may be too strong for some other occupants. In each of these cases, the occupant has uncomfortable feeling, and the sufficient occupant protection cannot be achieved.

SUMMARY OF THE INVENTION

The present invention addresses the above disadvantage. Thus, it is an objective of the present invention to provide a seat belt system, which addresses the above disadvantage.

To achieve the objective of the present invention, there is provided a seat belt system for a vehicle. The seat belt system includes a collision predicting device, an occupant sensing device, a seat belt, a seat belt drive device and a seat belt control device. The collision predicting device senses an imminent collision of the vehicle before the collision actually takes place. The occupant sensing device determines an occupant state on a seat of the vehicle. The seat belt restrains an occupant to the seat. The seat belt drive device retracts and extends the seat belt. The seat belt control device drives the seat belt drive device to retract the seat belt and thereby to achieve a corresponding tension of the seat belt, which corresponds to the occupant, based on a signal outputted from the collision predicting device and occupant information outputted from the occupant sensing device.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

Figure 1:
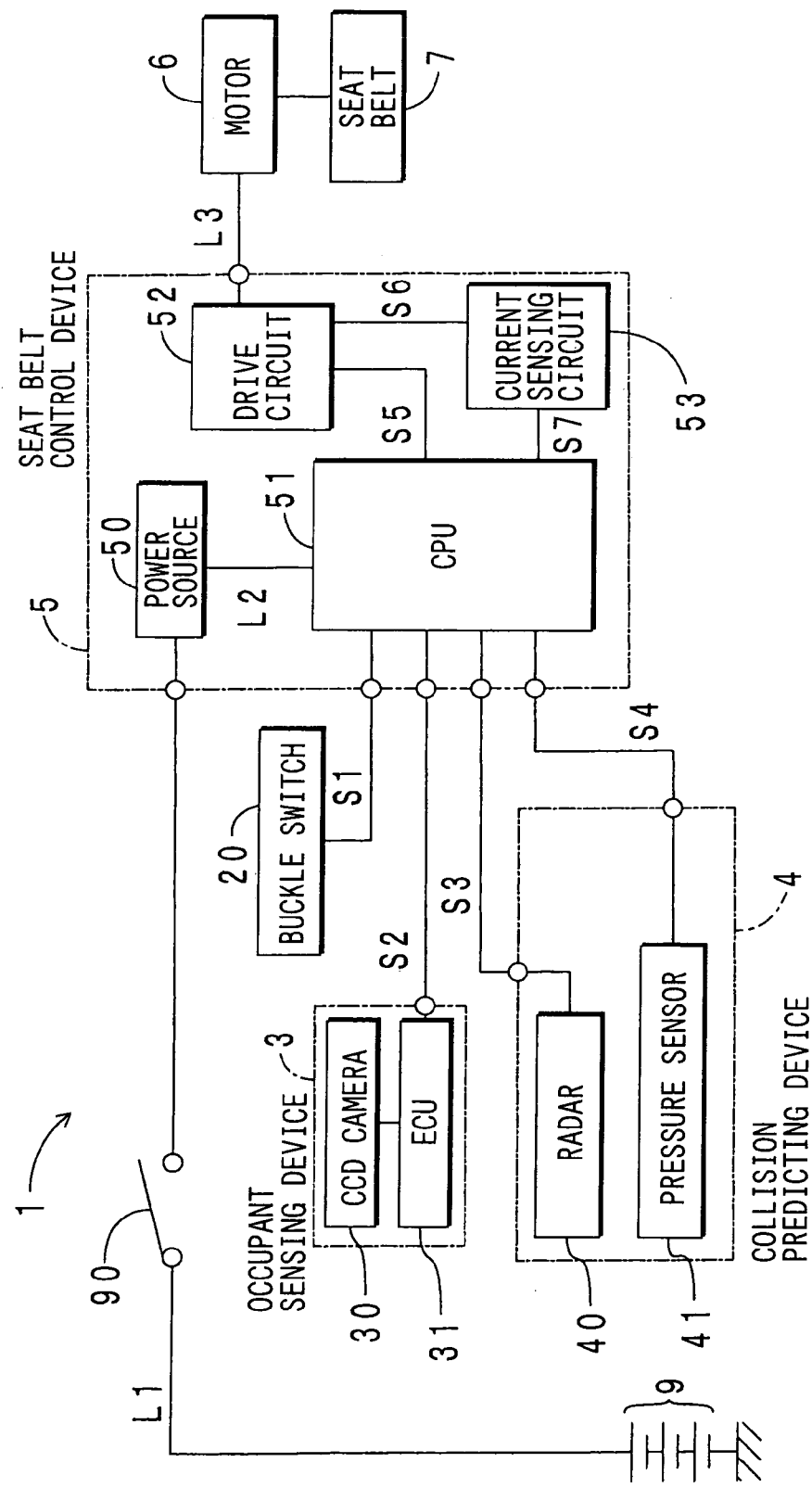
FIG. 1 is a block diagram showing a seat belt system according to a first embodiment of the present invention.

A seat belt system for a vehicle according to a first embodiment of the present invention will be described. FIG. 1 is a block diagram showing the seat belt system of the present embodiment installed in the subject vehicle. As shown in FIG. 1, the seat belt system 1 includes a buckle switch 20, an occupant sensing device 3, a collision predicting device 4, a seat belt control device 5, a motor 6 and a seat belt 7.

The buckle switch 20 is received in a buckle, which is installed to a seat frame. The buckle is connected to a tongue, which is, in turn, connected to the seat belt 7 (described latter). When the tongue is connected to the buckle, the buckle switch 20 is turned on.

The occupant sensing device 3 includes a CCD camera 30 and an occupant sensing electronic control unit (ECU) 31. The CCD camera 30 is installed to a corner of a room mirror. The CCD camera 30 captures an image of an occupant on a seat. The occupant sensing ECU 31 is received in a front passenger seat side end of an instrument panel. The occupant sensing ECU 31 senses and determines a locus of transition points of pixel gray scale based on the image data of the captured image, which is captured by the CCD camera 30. Based on the locus, the occupant sensing ECU 31 determines whether the occupant is seating on the seat. Furthermore, in the case where the occupant is seating on the seat, the occupant sensing ECU 31 also determines a body size (e.g., a sitting height) of the occupant (occupant information) based on the locus.

The collision predicting device 4 includes a millimeter wave radar 40 and a master cylinder pressure sensor 41. The millimeter wave radar 40 is embedded at an ornament rear side of a front grille of the vehicle. The millimeter wave radar 40 senses a front vehicle or a front obstacle, which is located in front of the subject vehicle in a traveling direction of the vehicle. Furthermore, the millimeter wave radar 40 senses, for example, a distance between the subject vehicle and the front vehicle and/or a relative speed between the subject vehicle and the front vehicle. The master cylinder pressure sensor 41 is arranged in an engine room and senses a master cylinder pressure, which varies in connection with a change in an applied pressing force on a brake pedal.

The seat belt control device 5 includes a constant voltage power source 50, a seat belt central processing unit (CPU) 51, a motor drive circuit 52 and an electric current sensing circuit 53. The constant voltage power source 50 is connected to a vehicle battery 9 through a power supply line L1. An ignition switch 90 is inserted in the power supply line L1. The constant voltage power source 50 converts the high voltage of the vehicle battery 9 to a corresponding low voltage. The constant voltage power source 50 is connected to the seat belt CPU 51 through a power supply line L2.

The seat belt CPU 51 is connected to the buckle switch 20, the occupant sensing device 3, the millimeter wave radar 40 and the master cylinder pressure sensor 41 through signal lines S1-S4, respectively. A signal of the buckle switch 20 is transmitted to the seat belt CPU 51 through the signal line S1. Body size data of the occupant is transmitted to the seat belt CPU 51 through the signal line S2. The data, which indicates the distance between the subject vehicle and the front vehicle and/or the relative speed between the subject vehicle and the front vehicle, is transmitted to the seat belt CPU 51 through the signal line S3. Furthermore, the data, which indicates the master cylinder pressure, is transmitted to the seat belt CPU 51 through the signal line S4. Based on the occupant body size data, which is received from the occupant sensing device 3, the seat belt CPU 51 determines a corresponding tension of the seat belt 7 at the time of retracting the seat belt 7. Furthermore, based on the data of the millimeter wave radar 40 and the data of the master cylinder pressure sensor 41, the seat belt CPU 51 determines whether the imminent collision is unavoidable. When the seat belt CPU 51 determines that the imminent collision is unavoidable, the seat belt CPU 51 transmits a drive signal to the motor drive circuit 52 through a signal line S5.

The motor drive circuit 52 is connected to the motor 6 through a power supply line L3. The motor drive circuit 52 drives the motor 6 based on the drive signal, which is transmitted from the seat belt CPU 51. Through rotation of the motor 6, the seat belt 7 is retracted. The motor 6 is included in a seat belt drive device of the present invention. The current sensing circuit 53 is connected to the motor drive circuit 52 through a signal line S6 and is also connected to the seat belt CPU 51 through a signal line S7. The current sensing circuit 53 senses the value of the electric current in the motor drive circuit 52 and outputs current data, which indicates the sensed value of the electric current, to the seat belt CPU 51 through the signal line S7. The seat belt CPU 51 computes the tension of the seat belt 7 based on the transmitted current data. The seat belt CPU 51 controls the tension of the seat belt 7 to coincide with a predetermined corresponding value.

Next, operation of the seat belt system of the present embodiment will be described. When the ignition switch 90 is turned on, the high voltage is supplied from the vehicle battery 9 to the constant voltage power source 50 through the power supply line L1. The voltage, which is converted in the constant voltage power source 50, is supplied to the seat belt CPU 51 through the power supply line L2. In this way, the seat belt system 1 is activated.

First, an image, which indicates an occupant state on the seat (including presence/absent of the occupant on the seat and/or a size of the occupant on the seat), is captured by the CCD camera 30 of the occupant sensing device 3. The image data of the image, which is captured by the CCD camera 30, is transmitted to the occupant sensing ECU 31. The occupant sensing ECU 31 determines presence of the occupant on the seat based on the image data. When it is determined that the occupant is present on the seat, the occupant sensing ECU 31 determines the body size of the occupant on the seat based on the image data. The determined result of the occupant state on the seat is transmitted to the seat belt CPU 51 through the signal line S2. When an ON signal is transmitted from the buckle switch 20 to the seat belt CPU 51, the seat belt CPU 51 determines the tension of the seat belt 7 at the time of retracting the seat belt 7 based on the occupant body size data, which is transmitted from the occupant sensing device 3.

The distance between the subject vehicle and the front vehicle and/or the relative speed between the subject vehicle and the front vehicle are transmitted from the millimeter wave radar 40 to the seat belt CPU 51. The master cylinder pressure is transmitted from the master cylinder pressure sensor 41 to the seat belt CPU 51. Based on at least one of the data of the millimeter wave radar 40 and the data of the master cylinder pressure sensor 41, the seat belt CPU 51 determines whether the imminent collision is unavoidable. When the seat belt CPU 51 determines that the imminent collision is unavoidable, the seat belt CPU 51 transmits the drive signal to the motor drive circuit 52 through the signal line S5. The motor drive circuit 52 drives the motor 6. In this way, the seat belt 7 is retracted. At this time, the seat belt CPU 51 controls the tension of the seat belt 7 to coincide with the predetermined corresponding value based on the current data, which is sensed by the current sensing circuit 53.

Next, advantages of the seat belt system 1 of the present embodiment will be described. In the seat belt system 1 of the present embodiment, the occupant sensing device 3, which includes the CCD camera 30, is used. The body size of the occupant can be easily determined by obtaining the occupant information through the image recognition process of the captured image. Based on the body size data of the occupant, the tension of the seat belt 7 at the time of retracting the seat belt 7 is determined. Thus, in the case where it is determined that the imminent collision is unavoidable, even when the seat belt 7 is retracted, the occupant is restrained by the seat belt with the corresponding tension, which corresponds to the body size of the occupant. Thus, the occupant has less uncomfortable feeling. Furthermore, the occupant is restrained by the seat belt with the suitable tension, which is suitable to the individual occupant. Thus, safety of the occupant is relatively high.

Second Embodiment

A second embodiment of the present invention will be described. The second embodiment differs from the first embodiment in the following points. That is, a fastening state of the seat belt 7 is sensed by the occupant sensing device 3, and a buckle moving device 8 is added in the second embodiment. Thus, in the following discussion, these differences are mainly discussed.

Figure 2:
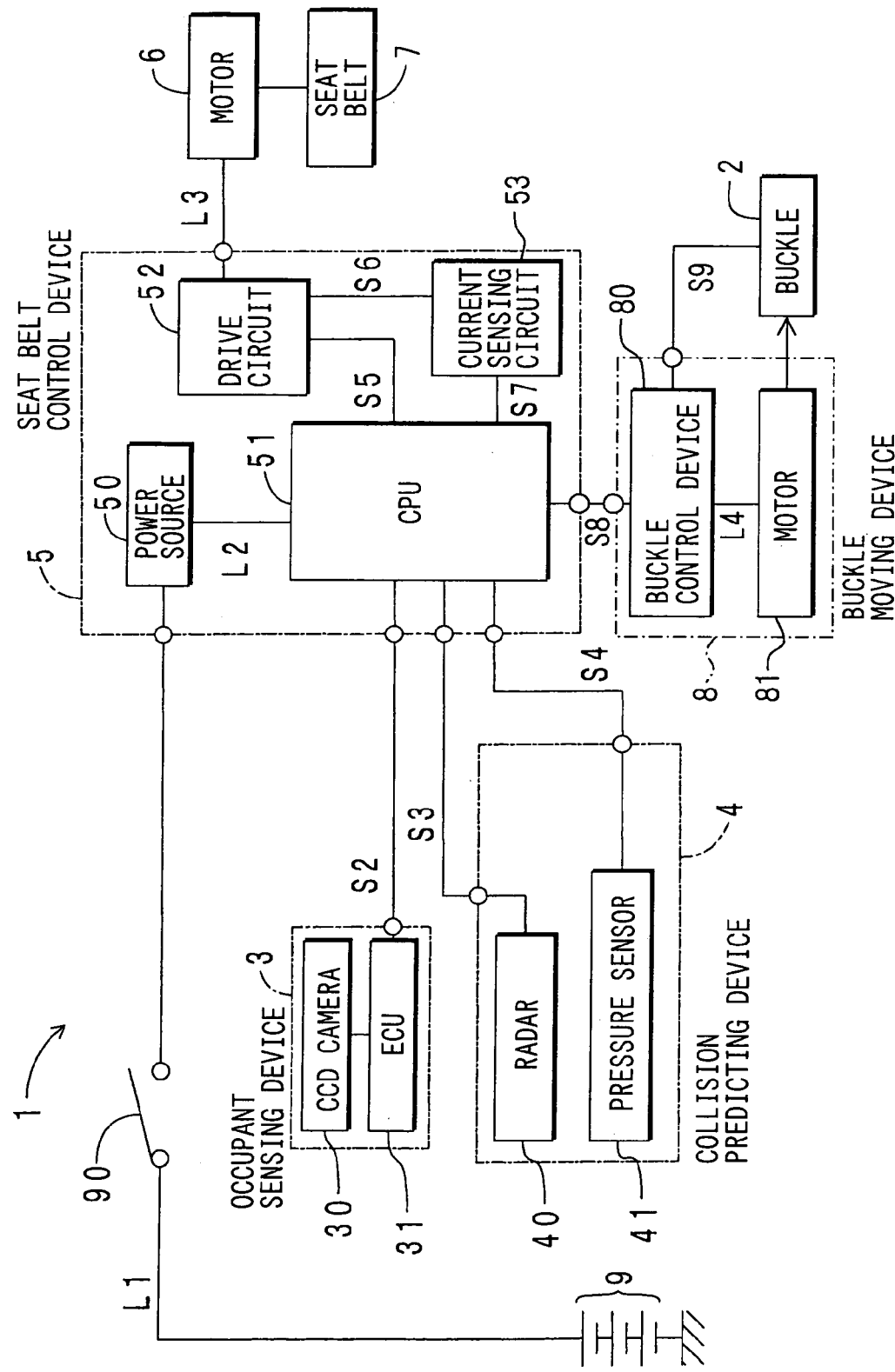
FIG. 2 is a block diagram showing a seat belt system according to a second embodiment of the present invention.
Figure 3A:
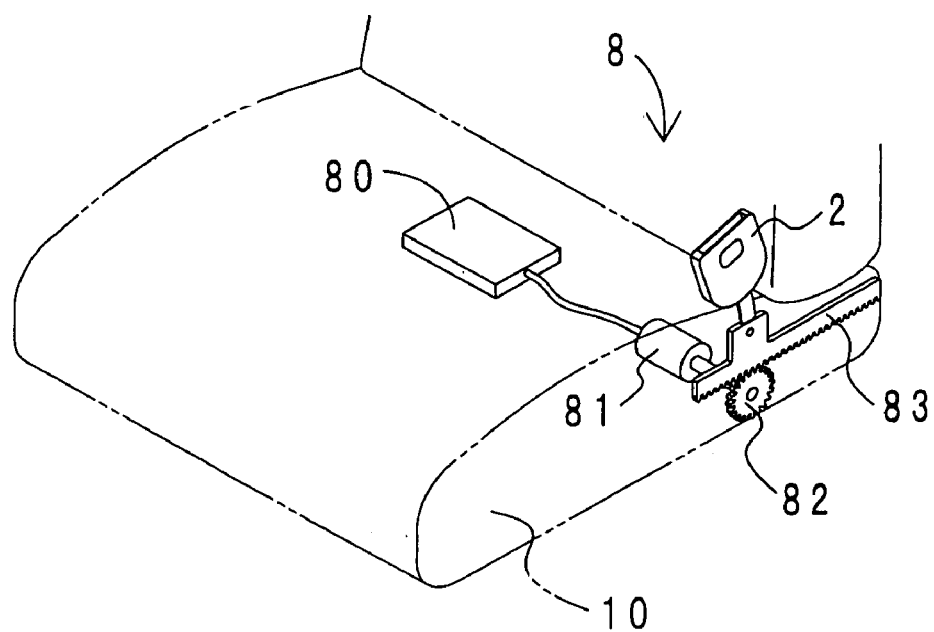
FIG. 3A is a diagram showing a state of a buckle moving device of the seat belt system of the second embodiment before movement of a buckle.
Figure 3B:
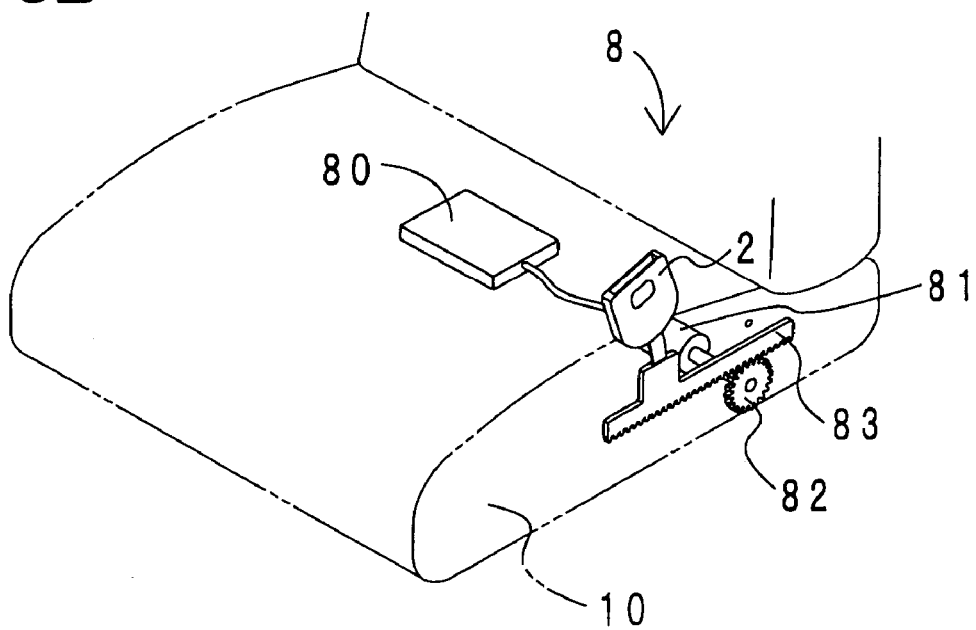
FIG. 3B is a diagram showing another state of the buckle moving device of the seat belt system of the second embodiment after the movement of the buckle.

FIG. 2 is a block diagram of the seat belt system 1 of the second embodiment. FIGS. 3A and 3B are schematic diagrams showing the buckle moving device 8 of the seat belt system 1. More specifically, FIG. 3A shows a state of the buckle moving device 8 before movement of the buckle 2. FIG. 3B shows another state of the buckle moving device 8 after the movement of the buckle 2 toward the front end of the seat. In FIGS. 2 to 3B, components similar to those of FIG. 1 will be indicated by the same numerals. As shown in FIGS. 2 to 3B, the buckle moving device 8 is connected to the seat belt CPU 51 thorough a signal line S8.

Based on the image data of the image captured through the CCD camera 30, the occupant sensing ECU 31 of the occupant sensing device 3 senses and determines the seat belt fastening state in addition to the body size of the occupant. In addition to the occupant body size data, the occupant sensing device 3 transmits the seat belt fastening state data (seat belt fastening state information) indicative of the fastening state of the seat belt to the seat belt CPU 51.

The seat belt fastening state information indicates a state of the seat belt, such as a contact position of the seat belt relative to the occupant.

The buckle moving device 8 includes a buckle control device 80, a motor 81, a pinion 82 and a rack 83. The buckle control device 80 and the motor 81 are connected to each other through a power supply line L4. The buckle control device 80 receives an operation command from the seat belt CPU 51 and drives the motor 81 based on the operation command. The pinion 82 is connected to the motor 81 through a rotatable shaft. Furthermore, the rack 83 is arranged along the seat frame (not shown) of the seat 10 to mesh with the pinion 82. The rack 83 is movable relative to the seat 10 in a fore-and-aft direction of the seat 10. The buckle 2 is connected to a top of the rack 83. The buckle 2 is connected to the buckle control device 80 through a signal line S9. A buckle switch (not shown) is received in the buckle 2. An ON signal of the buckle switch is transmitted to the buckle control device 80 through the signal line S9. Then, the ON signal of the buckle switch is transmitted from the buckle control device 80 to the seat belt CPU 51 through the signal line S8.

The seat belt CPU 51 transmits a drive signal to the motor drive circuit 52 through the signal line S5 when the seat belt CPU 51 determines that the imminent collision is unavoidable. In addition, based on the seat belt fastening state data received from the occupant sensing device 3, the seat belt CPU 51 outputs an operation command to the buckle moving device 8 through the signal line S8. Based on this operation command, the buckle control device 80 drives the motor 81. When the motor 81 is driven, the pinion 82 is rotated. When the pinion 82 is rotated, the rack 82 is moved from the position shown in FIG. 3A toward the front end of the seat 10, as shown in FIG. 3B. Due to the movement of the rack 83, the buckle 2 is also moved toward the front end of the seat 10. In this way, the position of the seat belt 7 is changed.

The seat belt system 1 of the present embodiment achieves the same advantages as those of the seat belt system of the first embodiment in terms of adjusting the tension of the seat belt 7 based on the occupant body size. In addition, in the seat belt system 1 of the present embodiment, the position of the buckle 2 is moved based on the fastening state of the seat belt 7. For example, when the occupant leans on a door arm rest to laterally tilt his/her body, or when the occupant seats shallowly in the seat and rests his/or her back on a seat back, the fastening state of the seat belt differs from that of the normal seating state of the occupant. In such a case, when the direction of the tension of the seat belt is changed according to the seating state of the occupant, the occupant can be more effectively restrained. Accordingly, the seat belt system 1 of the present embodiment can apply the tension of the seat belt 7 from the appropriate direction based on the seating state of the occupant on the seat 10 by moving the position of the buckle 2 according to the fastening state of the seat belt 7. As a result, the seat belt system 1 of the present embodiment can effectively restrain the occupant to improve the safety of the occupant. Furthermore, the operational reliability of the seat belt system 1 is improved.

The present invention has been described with reference to the first and second embodiments. However, it should be noted that the seat belt system of the present invention is not limited to those described in the first and second embodiments. That is, the seat belt systems of the above embodiments can be modified without departing the scope of the present invention.

For example, in each of the above embodiments, the occupant sensing device obtains the occupant information through the image recognition of the image captured by the camera (an image capture sensor) 30. However, the sensor used in the occupant sensing system is not limited to any particular one. Besides the above described image capture sensor, any other sensor, such as a load sensor, a pressure sensor or a distance sensor, can be used in the occupant sensing device. Also, any combination of two or more of the above sensors can be used in the occupant sensing device. For example, the image capture sensor and the load sensor can be advantageously used in combination in the occupant sensing device to obtain the occupant body size information and the occupant weight information (occupant information).

Furthermore, in the above embodiments, the collision predicting device includes the millimeter wave radar and the master cylinder pressure sensor. However, the type of the collision predicting device is not limited to any particular one. For example, the collision predicting device may include an ultrasonic radar (or a sensor) in order to sense a front vehicle, which is present in front of the subject vehicle. Also, in order to sense abrupt braking, the collision predicting device may include an antilock brake system (ABS) operation signal sensor for sensing an ABS operation signal or a vehicle speed sensor. The collision predicting device may include anyone of or both of the sensor for sensing the front vehicle and the sensor for sensing the abrupt braking.

In the above embodiments, the seat belt CPU determines whether the imminent collision is unavoidable based on the data transmitted from the millimeter wave radar and the data transmitted from the master cylinder pressure sensor. However, in the case where the collision predicting device includes the sensor and a collision determining ECU, the collision predicting device can determine whether the imminent collision is unavoidable. In this case, the result of this determination may be transmitted from the collision predicting device to the seat belt CPU. Then, the seat belt CPU drives the seat belt drive device based on the result of the determination.

Additional advantages and modifications will readily occur to those skilled in the art. The invention in its broader terms is therefore not limited to the specific details, representative apparatus, and illustrative examples shown and described.

What is claimed is:

1. A seat belt system for a vehicle, the seat belt system comprising:
   a collision predicting device that senses an imminent collision of the vehicle before the collision actually takes place;
   an occupant sensing device configured to determine an occupant state on a seat of the vehicle;
   a seat belt configured to restrain an occupant to the seat;
   a seat belt drive device configured to retract and extend the seat belt;
   a seat belt control device configured to drive the seat belt drive device to retract the seat belt and to achieve a corresponding tension of the seat belt, which corresponds to the occupant, based on a signal outputted from the collision predicting device and occupant information outputted from the occupant sensing device; and
   a buckle moving device configured to move a position of a buckle, which is connected to a tongue, that is in turn, connected to the seat belt, wherein:

the occupant sensing device is configured to sense a fastening state of the seat belt;

the seat belt control device is configured so that, when the seat belt control device drives the seat belt drive device to retract the seat belt and to achieve the corresponding tension of the seat belt, which correspond to the occupant, the seat belt control device outputs an operation command to the buckle moving device to move the position of the buckle based on fastening state information that indicates the fastening state of the seat belt, which is sensed by the occupant sensing device; and the buckle moving device is configured to move the position of the buckle to change a direction of the tension of the seat belt.

2. The seat belt system according to claim 1, wherein the occupant sensing device includes an image capture sensor.

3. The seat belt system according to claim 2, wherein the image capture sensor is a CCD camera.

4. The seat belt system according to claim 2, wherein the occupant information includes a body size of the occupant that is obtained based on image data of a captured image of the occupant, which is captured by the image sensor.

5. The seat belt system according to claim 1, wherein the buckle moving device is configured to move the position of the buckle in a front-to-back direction of the seat.

6. The seat belt system according to claim 1, wherein the buckle moving device is configured to move the position of the buckle without substantially changing a vertical position of the buckle.

7. The seat belt system according to claim 1, wherein the fastening state of the seat belt indicates a contact position of the seat belt relative to the occupant.

* * * * *